(12) United States Patent
Fu (10) Patent No.: US 10,180,671 B2
(45) Date of Patent: Jan. 15, 2019

(54) CONTEXT AWARENESS CONTROL DEVICE, SYSTEM AND METHOD

(71) Applicant: SHENZHEN SKYWORTH-RGB ELECTRONIC CO., LTD, Shenzhen (CN)

(72) Inventor: Chunyuan Fu, Shenzhen (CN)

(73) Assignee: SHENZHEN SKYWORTH-RGB ELECTRONIC CO., LTD, Shenzhen (CN)

( * ) Notice: Subject to any disclaimer, the term of this patent is extended or adjusted under 35 U.S.C. 154(b) by 358 days.

(21) Appl. No.: 14/916,619

(22) PCT Filed: Jan. 15, 2015

(86) PCT No.: PCT/CN2015/070776
§ 371 (c)(1),
(2) Date: Mar. 4, 2016

(87) PCT Pub. No.: WO2016/065745
PCT Pub. Date: May 6, 2016

(65) Prior Publication Data
US 2016/0299480 A1 Oct. 13, 2016

(30) Foreign Application Priority Data
Oct. 30, 2014 (CN) .......................... 2014 1 0595616

(51) Int. Cl.
*G05B 19/04* (2006.01)
*G05B 13/02* (2006.01)
*G05B 19/042* (2006.01)

(52) U.S. Cl.
CPC ......... *G05B 19/042* (2013.01); *G05B 13/025* (2013.01); *G05B 2219/23288* (2013.01); *G05B 2219/23425* (2013.01)

(58) Field of Classification Search
None
See application file for complete search history.

(56) References Cited

U.S. PATENT DOCUMENTS 4,608,701 A * 8/1986 Burgers ............... H01Q 3/2617
342/368
5,949,908 A * 9/1999 Sugahara ............. H04N 19/139
375/E7.129

(Continued)

FOREIGN PATENT DOCUMENTS

CN 101222394 A 7/2008
CN 101576748 A 11/2009

(Continued)

OTHER PUBLICATIONS

Chang, C.-Y.; Chou, C.-F. and Chen, K.C., "Content-Priority-Aware Chunk Scheduling Over Swarm-Based P2P Live Streaming System: From Theoretical Analysis to Practical Design", Mar. 2014, IEEE Journal on Emerging and Selected Topics in Circuits and Systems, vol. 4, No. 1.*

(Continued)

*Primary Examiner* — Mohammad Ali
*Assistant Examiner* — Kelvin Booker
(74) *Attorney, Agent, or Firm* — Anova Law Group, PLLC (57) ABSTRACT

The invention discloses a context awareness control device, system and method. The context awareness control device comprises a connection module, a sensor module, an emission control module, an information processing module and an adjustment control module. The sensor module collects environmental information and transmits the environmental information to the information processing module. The information processing module collects use information of a terminal device through the connection module. The adjustment control module makes a comparison between the (Continued)

function situation information and the pre-stored better environment value according to the detected currently executing function, outputs a first environment control signal according to the comparison results to adjust the working state of the terminal device and emits a second environment control signal through the emission control module to adjust the working state of the electrical equipment.

12 Claims, 4 Drawing Sheets

(56) References Cited

U.S. PATENT DOCUMENTS

| | | | | |
|---|---|---|---|---|
| 7,006,881 | B1* | 2/2006 | Hoffberg | G05B 15/02 700/17 |
| 9,171,251 | B2* | 10/2015 | Camp | H04W 4/029 |
| 9,716,939 | B2* | 7/2017 | Di Censo | H04R 1/1083 |
| 9,727,115 | B1* | 8/2017 | Brown | G06F 1/3203 |
| 9,817,524 | B1* | 11/2017 | Christy | G06F 3/044 |
| 9,921,557 | B2* | 3/2018 | Slupik | G05B 15/02 |
| 2005/0179540 | A1* | 8/2005 | Rubenstein | B60R 16/0373 340/539.18 |
| 2008/0304361 | A1* | 12/2008 | Peng | G01S 15/74 367/127 |
| 2010/0076793 | A1* | 3/2010 | Goldstein | G06F 21/10 705/4 |
| 2014/0309870 | A1* | 10/2014 | Ricci | H04W 4/21 701/36 |
| 2015/0172878 | A1* | 6/2015 | Luna | H04W 4/12 455/412.2 |
| 2015/0195641 | A1* | 7/2015 | Di Censo | H04R 1/1083 381/71.6 |
| 2015/0200787 | A1* | 7/2015 | Slupik | G05B 15/02 700/275 |
| 2015/0232065 | A1* | 8/2015 | Ricci | B60R 25/01 701/36 |
| 2016/0187961 | A1* | 6/2016 | Elibol | G06F 1/3293 713/323 |
| 2017/0075701 | A1* | 3/2017 | Ricci | G06F 9/4443 |

FOREIGN PATENT DOCUMENTS

| | | |
|---|---|---|
| CN | 101782772 A | 7/2010 |
| EP | 1074352 A2 | 2/2001 |
| JP | 2005236900 A | 9/2005 |

OTHER PUBLICATIONS

Gao, W.; Chen, C.W.; Shamir, A. and Yan, B., "Guest Editorial Content-Aware Visual Systems: Analysis, Streaming, and Retargeting", Mar. 2014, IEEE Journal on Emerging and Selected Topics in Circuits and Systems, vol. 4, No. 1.*

Liu, Y.; Wang, S. and Dey, S., "Content-Aware Modeling and Enhancing User Experience in Cloud Mobile Rendering and Streaming", Mar. 2014, IEEE Journal on Emerging and Selected Topics in Circuits and Systems, vol. 4, No. 1.*

Wong, M.S.; Yip, T.P. and Mok, E., "Development of a Personal Integrated Environmental Monitoring System", Jul. 16, 2014, Sensors, 14, 22065-22081.*

The World Intellectual Property Organization (WIPO) International Search Report for PCT/CN2015/070776 dated May 4, 2015.

* cited by examiner

CONTEXT AWARENESS CONTROL DEVICE, SYSTEM AND METHOD

CROSS-REFERENCES TO RELATED APPLICATIONS

This application is a national stage patent application of PCT application No. PCT/CN2015/070776, filed on Jan. 15, 2015. This application claims priority to Chinese Patent Application No. 201410595616.8, filed on Oct. 30, 2014, the entire content of which is incorporated herein by reference.

FIELD OF THE INVENTION

The present invention relates to the field of electronic terminal device technology, and more particularly, to a context awareness control device, system and the method thereof.

BACKGROUND

As we all know, when a terminal device salesman is demonstrating the functions of a terminal device, or a user is testing a terminal device at home after buying, the functional effect of the terminal device has a great relationship with the environment for use. For example, the differences of a network condition, a number of all users, a brightness of light, room space, location, and ambient temperature, all have a certain effect on the functions in a terminal device.

The existing terminal devices are hard to adjust some of their functions automatically, according to the surrounding environment and situations. For example, when making voice calls through a smart TV, if the smart TV is also playing some network programs and the surrounding environment is noisy, then the slow network will affect the voice recognition speed, and the ambient noises will also affect the voice capturing. In such a case, it will require the user to manually shut the network down, and adjust the microphone's voice capturing capacities and noise filtering capacities. If the use environment gets changed again, the user has to manually adjust the related functions of a Smart TV again, according to the actual situations. While for some features of the equipment, a user may not know if they are running or not (such as network connection), or not know how to adjust their functions.

Currently, some manufacturers may recognize the use environments of a terminal device through field collections, and preset several situation patterns in the terminal device before leaving the factory, which are provided for user's selections or manual adjustments. However, the cost of a manual collection of the use environment information is too high, which includes not only labor costs, but also time costs and more. Also, if the surrounding environment changes, it will be required to recollect the environmental information.

Further, there are relatively large errors in manual collections. If fewer samples are collected, then it will be impossible to control the settings according to the real environmental situations, which means bad control flexibility. If a lot of samples are collected, the cost will be too high, and a large number of sample data will consume a lot of resources. Also, the existing terminal devices can't collect information automatically according to their surrounding environments thus can't make adjustments accordingly.

The disclosed devices, systems and methods are directed to solve one or more problems set forth above and other problems.

BRIEF SUMMARY OF THE DISCLOSURE

According to the above mentioned defects in the prior arts, the purpose of the present invention is providing a context awareness control device, system and the method thereof, which is able to obtain a user's environmental information and adjust the settings of a terminal device, in order to match a best use environment setting for the functions in a terminal device.

In order to achieve the above said purposes, the following technology protocols are adopted in the present invention:

A context awareness control device, connecting to a terminal device and electrical equipment, comprises: a connection module, a sensor module, an emission control module, an information processing module and an adjustment control module.

The sensor module collects an environmental information and transmits to the information processing module. The information processing module collects a use information of the terminal device through the connection module, and integrates with the environmental information together to generate a function situation information. The adjustment control module compares the generated function situation information to a pre-stored better environment value, and outputs a first environment control signal to adjust the working state of the terminal device, according to the detected currently executing functions, as well as transmitting a second environment control signal to adjust the working state of the electrical equipment through the emission control module.

In the context awareness control device, the information processing module includes an information collection unit and an information storage unit. The information collection unit receives the environmental information, collects the use information from a terminal device, then combines the environmental information and use information to the corresponding function in the terminal device, and obtains the function situation information when the specific function is executing. The information storage unit classifies and saves the function situation information, as well as updating in a real time basis.

In the context awareness control device, the use information of the terminal device collected by the information collection unit includes: the current network speed of the terminal device, the system and memory usage, the functions currently running, the functions running in the background, the radio interferences, and the number of people around, the user's age, use frequencies, watching habits, as well as the time, the device volume, the network security and the screen brightness.

In the context awareness control device, the adjustment control module includes a functions detection unit and an instructions comparison unit.

The functions detection unit detects the states of the currently executing functions and the background executing functions. According to the detected currently executing functions, the instructions comparison unit calls and compares the information value collected from the related information items in the function situation information with the better environment value. Then the instructions comparison unit extracts those information value and the information items, while they are not in the ranges of better environment value, finally outputs the first environment control signals and the second environment control signals, according to the differences between the extracted information value and the better environment value.

In the context awareness control device, the sensor module includes a temperature sensor, a humidity sensor, a position sensor, a spatial sensor, a light intensity sensor, a noise sensor and a radio interference sensor.

In the context awareness control device, the emission control module includes: an IR transmitter, applied to convert the second environment control signals into infrared signals before transmitting; a 2.4 G transmitter, applied to transmit the second environment control signals in radio for transmission.

A context awareness control system, wherein, it includes a terminal device, an electrical equipment and the context awareness control device, which inserts and connects to the terminal device, and connects to the electrical equipment in wireless;

The context awareness control device obtains the surrounding environmental information and the terminal device use information, compares the environmental information and the use information with the pre-stored better environment value, generates the first environment control signals and the second environment control signals based on the comparison results, applied to adjust the functions of the terminal device and the electrical equipment accordingly.

A context awareness control method, wherein, it includes: a sensor module, applied to collect the environmental information and transmit to an information processing module; an information processing module, applied to collect the use information of the terminal device through a connection module, and integrate with the environmental information into function situation information; an adjustment control module, applied to compare the function situation information to the pre-stored better environment value, based on the detected currently executing functions, output the first environment control signals to adjust the working state of the terminal device, according to the comparison results; as well as transmitting the second environment control signals to adjust the working state of the electrical equipment, through a emission control module.

In the context awareness control method, the steps on the information processing module collecting the use information of the terminal device through the connection module, and integrating the use information with the environmental information into function situation information, in details, include: obtaining the environmental information through an information collecting unit, that is, collecting the environmental information from the terminal device; combining the environmental information and use information to the corresponding function in the terminal device, and obtaining the function situation information when the specific function is running; and classifying and saving the function situation information through an information storage unit, as well as updating in real time.

In the context awareness control method, the adjustment control module compares the function situation information to the pre-stored better environment value, and outputs the first environment control signals to adjust the working state of the terminal device, according to the comparison results; as well as transmitting the second environment control signals to adjust the working state of the electrical equipment through the emission control module, the steps above, in details, include:

the functions detection unit detects the running status of the currently executing functions, and the background executing functions;

the instructions comparison unit calls and compares the information value collected from the related information items in the function situation information with the better environment value, extracts those information value and the information items, while they are not in the ranges of better environment value, and outputs the first environment control signals and the second environment control signals, according to the differences between the information value and the better environment value; and the emission control module emits the second environment control signals, applied to adjust the working state of the electrical equipment, and the connection module emits the first environment control signals to the terminal device, applied to adjust the working state of the terminal device.

Comparing to the prior art, the present invention provides a context awareness control device, system and the method thereof. The context awareness control device inserts and connects to a terminal device, collects the environmental information through a sensor module and transmits to an information processing module. The information processing module collects the use information of the terminal device through a connection module, and integrates together with the environmental information, generating a function situation information.

The adjustment control module compares the function situation information to a saved better environment value, and outputs a first environment control signal to adjust the working state of the terminal device. The adjustment control module further emits a second environment control signal to adjust the working state of the electrical equipment through the emission control module, according to the comparison results, thus adjust the surrounding environments appropriately, to provide a better use environment for users. It also helps to guide and promote the development of terminal devices, especially the development of intelligent TVs. It provides a new intelligent displaying method for terminal devices, and has a broad application prospect and a practical value.

More detailed descriptions on the specific embodiments of the present invention are described below, together with the accompany drawings.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. It is apparent that the described embodiments are some but not all of the embodiments of the present invention. Based on the disclosed embodiments, persons of ordinary skill in the art may derive other embodiments consistent with the present disclosure, all of which are within the scope of the present invention The present invention provides a context awareness control device, system and method.

The context awareness control device provided in the present invention is inserted into a terminal device to be controlled during applying. The context awareness control device collects the use information of the terminal device and the environmental information around the terminal device through situation awareness, then compares the currently obtained environmental information and use information to the saved better environment value (that is, the best setting value of the use environment for running a function in the terminal device). Then based on the comparison results, the context awareness control device makes appropriate adjustments to the related functions (such as the background running system, audio system or else) and the surrounding environments (such as temperature, brightness or else), in order to promote the functions demonstrating and the usage of the terminal device running smoothly and provide a better use environment for users.

The context awareness control device also helps to guide and promote the development of terminal devices, especially the development of intelligent TVs. The context awareness control device provides a new intelligent demonstrating method for terminal devices, and has a broad application prospect and a practical value. The present invention is applicable not only to the technical fields of consumer electronic products, such as smart TV fields; but also to terminals with intelligent control systems, such as cell phones, tablet PCs, smart robots, etc.

Figure 1:
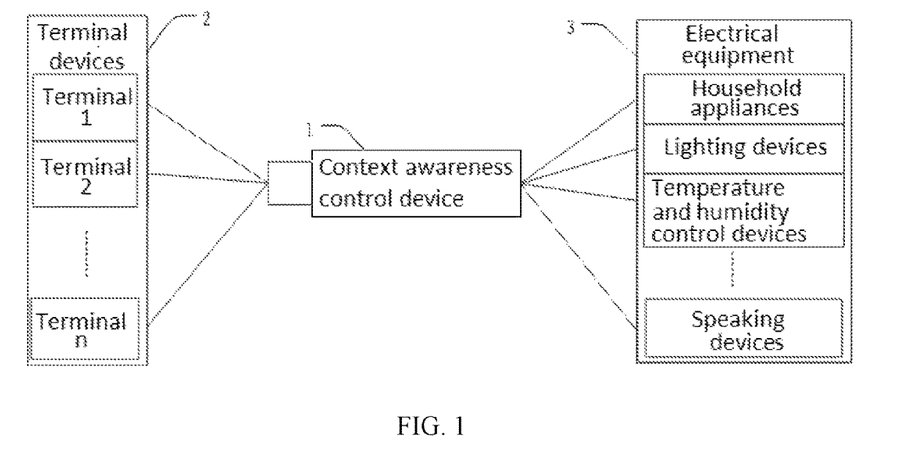
FIG. 1 illustrates a schematic diagram on an embodiment of the implementation of the context awareness control system as provided in the present invention.
Figure 2:
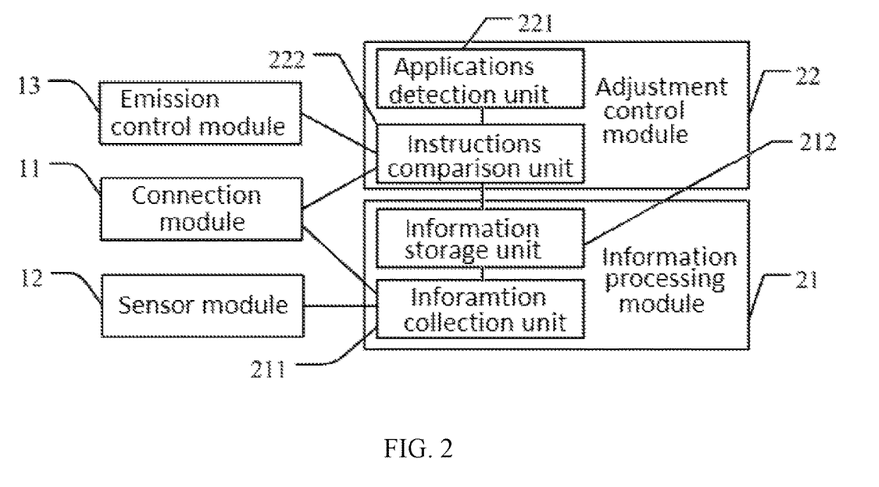
FIG. 2 illustrates a schematic block diagram on the context awareness control device as provided in the present invention.

Referencing to FIG. 1 and FIG. 2 together, the context awareness control system includes a context awareness control device 1, a terminal device 2 and an electrical equipment 3. The said context awareness control device 1 is inserted into the terminal device 2 in a USB port, and is connected to the electrical equipment 3 in wireless. The said terminal device 2 could be one of the terminal 1 (such as an intelligent TV), or terminal 2 (such as a cell phone), or terminal n (such as a tablet PC, an intelligent robot), or other terminals with intelligent control system. The said electrical equipment 3 include a household appliance, a lighting device, a temperature and humidity control device, a speaking device and else.

During using, insert the context awareness control device 1 into the terminal device to be controlled, the context awareness control device 1 acquires the surrounding environmental information (such as the ambient temperature, humidity, location, room space, light intensity, noise, etc.), as well as the use information of the terminal device (such as the current network speed, the system and memory usage, the functions currently running, the functions running in the background, the device volume, the network security, etc.).

The context awareness control device 1 compares the environmental information and the use information to the pre-stored better environment value, then generates a first environment control signal and a second environment control signal, based on the comparison results. The first environment control signals are applied to adjust the related functions running in the terminal device 2 properly (such as closing the current downloading work, increasing the volume and else). The second environment control signals are applied to adjust the related functions of the electrical equipment 3 (such as adjusting the AC temperature, changing the illumination brightness, and more), therefore, a better use environment for users is provided.

In the present embodiment, the said context awareness control device 1 adopts a plug and play method, and collects the surrounding environmental information, integrates the collected environmental information and the use information together, and compares with the preset better environment value. The said context awareness control device 1 also generates the first environment control signals, which may be applied to adjust some functions running in the terminal device. The said context awareness control device 1 also generates the second environment control signals, which may be applied to adjust the surrounding environment of the electrical equipment.

As shown in FIG. 2, the said context awareness control device 1 includes a connection module 11, a sensor module 12, an emission control module 13, an information processing module 21 and an adjustment control module 22. The said sensor module 12 connects to the information processing module 21, and collects the environmental information before transmitting to the information processing module 21. The information processing module 21 plugs and connects to the terminal device through the connection module 11, also connects to the adjustment control module 22.

The information processing module 21 collects the use information of the terminal device through the connection module 11, integrates the environmental information and the use information into function situation information, before transmitting to the adjustment control module 22. The adjustment control module 22 compares the function situation information to the saved better environment value, based on the detected currently executing functions. Then based on the comparison results, the adjustment control module 22 outputs the first environment control signals to adjust the working state of the terminal device through the connection module 11, and emits the second environment control signals to adjust the working state of the electrical equipment through the emission control module 13.

Wherein, the information processing module 21 includes an information collection unit 211 and an information storage unit 212. The adjustment control module 22 includes a functions detection unit 221 and an instructions comparison unit 222. The information collection unit 211 connects to the information storage unit 212, the connection module 11 and the sensor module 12, the instructions comparison unit 222 connects to the functions detection unit 221, the information storage unit 212, the emission control module 13 and the connection module 11.

Continue referring to FIG. 1 and FIG. 2, in specific implementations, the functional principles of the above said modules and units are as follows.

The said connection module 11 adopts a USB interface, applied to connect to the terminal device in a USB mode for data exchanging, for example, transmitting an obtaining instruction from the information processing module 21 to the terminal device, feeding the collected use information on the terminal device according to the obtaining instruction, back to the information processing module 21, and transmitting the first environment control signals generated by the adjustment control module 22 to the terminal device. In such a way, the context awareness control device may achieve a function of plug and play, may communicate with the terminal device in an easy, fast and stable way, and makes the terminal demonstrating staff or the users be able to adjust the related functions running in the terminal device automatically at any time.

The said sensor module 12 is applied to collect the environmental information, which includes a temperature sensor, a humidity sensor, a position sensor, a spatial sensor, an illumination intensity sensor, a noise sensor, a radio interference sensor and more.

The said emission control module 13 is applied to transmit the second environment control signals output from the environment adjusting module 24 to the corresponding electrical equipment (such as lighting functions, electric curtains, air conditions, fans, and more), to adjust the surrounding environments (such as the illumination intensity, temperature, humidity and else).

In specific implementations, the said emission control module 13 includes an IR transmitter, a 2.4 G transmitter, and a radio module.

The IR transmitter may convert the second environment control signals into infrared signals before sending out, which is mainly applied to control the electric appliances or lighting and speaking devices controlled by IR signals at home or in the markets.

The 2.4 G transmitter may transmit the second environment control signals in wireless signals, applied to control those electric appliances which can't be controlled by the IR transmitter.

The radio module may be applied to control the electric appliances with radio signals, according to the second environment control signals. The radio module may also link the surrounding PCs, cell phones and other devices together into a network, such that a user may remote control and adjust an environment condition, therefore, the control range is increased.

The said information collection unit 211 is applied to collect the environmental information surrounding the terminal device and its use information as well, then link this information together with the according functions in the terminal device, and achieve the function situation information when a user starts the function. In a specific implementation, the said function situation information may be converted into a data format such that it can be recognized by the system to save and load easily, and it provides the adjustment basis for the ambient environments.

The sources of the information in the said information collection unit 211 may be divided into two groups, one contains the environmental information obtained from the sensor module 12, which is collected by various sensors, such as the environmental information including temperature, humidity, position, spatial, lighting intensity, noise and more. While the other is the use information on the terminal device, collected by itself, including the terminal device information of the current network speed, the system and memory usage, the functions currently running, the functions running in the background, the radio interferences, and the number of people around (which may be achieved by the following method of: capturing the ambient images through a front facing camera installed in the terminal device, and counting the user's amount by face recognition technology), use frequencies, the device volumes, the network security, the screen brightness and more; as well as those information related to users, such as a user's age (which may be obtained from faces recognized, it also belongs to the prior technology), and watching habit (obtained by counting the programs a user watched and the watching time as well).

Figure 3:
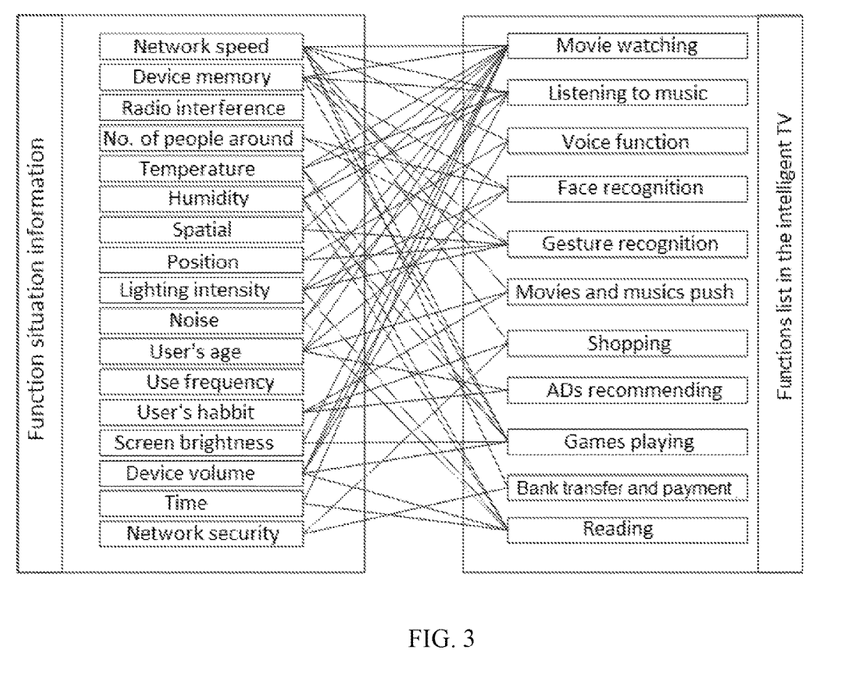
FIG. 3 illustrates a corresponding diagram on the function-situation information relationships in the context awareness control device as provided in the present invention.

The said information collection unit 211 transmits the said function situation information to the information storage unit 212 to classify and store, as well as real time updating. The present embodiment applies the classifications based mainly on their functions; the information storage unit 212 Indexes the function situation information and links to the corresponding functions installed in the terminal device. In such a way, a corresponding relationship chart between the functions installed in the terminal device and the situation information may be generated, as shown in FIG. 3. When the terminal device starts a certain function, it is possible to obtain the environment and use information for adjustments by inquiring the specific chart, when the terminal device starts running a specific function. The said information storage unit 212 updates the historical information with the newly obtained function situation information in order to save the storage spaces, and saving the function situation information into buffers may improve the visiting speed.

It should be understood that, the said information storage unit 212 has pre-stored some better environment value, i.e., the ranges of both value on the environmental information and the use information according to the better conditions for running the specific function. For example, when watching a movie, a certain room space dimension corresponds to a better device volume range; it may increase the voice volume appropriately if the user is an elder, or decrease the voice volume appropriately for a child. These data may be experience value provided by a manufacturer based on many experiments, they may also be modified by users according to their actual requirements.

Take an intelligent TV as an example, as shown in FIG. 3, on the right side, it is the functions list in an intelligent TV, including a plurality of functions. On the left side, it is a collection of the function situation information, includes a plurality of information items, and each information item saves the currently collected actual information value and the preset better environment value. It may be seen from FIG. 3, when a user is watching a movie, it may be affected by the network speed, device memory, temperature, humidity, room space, illumination intensity, noise, user's age, screen brightness, device volumes, time and other environmental information.

In particular, the network speed and device memory affects the smoothness of the movie playing, the temperature and humidity affects the user's physical comfort, the room space affects the user's visions (an appropriate watching distance is beneficial for vision protection, and a long time or a short distance watching may damage the vision), the noise, screen brightness and device volumes may also affect the user's watching experience. While the duration of movie watching also has impacts on the body, and a user's age affects the settings of the various function situation information described above, for example, the requirements to temperature, humidity and device volumes are also different between an elder and a younger.

When a user is running a voice function, it may be affected by the network speed, location, device volumes, ambient noises and other factors. Wherein, the network speed decides if a voice function can be run or not, and the recognition speed as well. The location, device volumes and ambient noises mainly affect the voice communication and recording.

When a user is running a gesture recognition function, it may be affected by factors including the device memory, the number of people around, location, lighting intensity and else. Wherein, the device memory mainly affects the smoothness of gesture recognition, the number of people around affects the gesture recognition sampling, the location affects if the intelligent TV could detect the gesture.

From FIG. 3, one can see, each executing function may be affected by a plurality of information items in the function situation information. Linking a function with these information items for later adjustments, may provide a better use environment for users.

Continue referring to FIG. 2, in specific implementations, the said functions detection unit 221 detects the running status of both functions currently running, and those running in the background. Followed by finding the corresponding information items according to the currently executing functions, then the corresponding environment adjustments will be achieved. For example, when an intelligent TV is playing a program, a downloading operation may be running in the background, or, when a voice function starts to run, the intelligent TV is still playing a video, together with data downloading in the background. In order to ensure a current function running smoother, some background operations may be paused, after the functions running state being detected by the functions detection unit 221.

The said instructions comparing unit 222 is a specific implement unit to control the environments. It calls the collected information value and the better environment value in the related information items in the function situation information. Then compares the information value to the better environment value, and extracts those information items and information value outside of the ranges of better environment value. While these information items are the environmental information and/or use information need to be adjusted. Then, based on these differences between the information value and the better environment value, the corresponding first and second environment control signals are output, according to the differences between the information value and the better environment value.

The said first environment control signals are according to the terminal devices. That is, the instructions comparing unit 222 may output the first environment control signals to control the usage status of the network, system memory, device volume, use time, network security and else, in order to improve the use smoothness and user's experiences on the TV functions. For example, when a user is currently watching a movie, the instructions comparing unit 222 outputs the first environment control signals including instructions for pausing downloading and functions online, as well as cleaning system memory, which will make the movie playing smoother. At the same time, the first environment control signals may also include an instruction turning the system volumes into an appropriate position according to the room sizes, and some instructions set to remind users the time for rest during movie watching.

The said second environment control signals are applied to control the electric appliances. For example, if the information items include temperature and brightness, when their information value are outside of the ranges of better environment value, and if the information value of a temperature (the real temperature is 30° C.) is higher than the better environment value of temperature (26° C.~28° C.), then an instruction is output to lower the temperature for 3 degrees. If an actual brightness is higher than that of the better environment value, then an instruction is output to lower the LED brightness. That means, both instructions for temperature and for brightness belong to the second environment control signals.

If the information value of a temperature (the real temperature is 20° C.) is lower than the better environment value of temperature (26° C.~28° C.), then an instruction is output to raise the temperature for 7 degrees. Similarly, if the actual brightness is relatively darker, then an instruction is output to raise the LED brightness. The second environment control signals output are transmitted to the emission control module 13, controlling the corresponding electric appliances through an IR transmitting mode, or a radio controlling mode, or a 2.4 G wireless transmission mode, such as controlling an AC to raise or lower the temperature, such that creating a comfortable movie watching environment for users. It may also turn off or reduce the ambient light and noise.

If the functions detection unit 221 detects the currently executing function is a voice function, then the instructions comparing unit 222 may output the second environment control signals to pause some unnecessary downloading and online functions currently running in the intelligent TV, and clean the system memory; while raising the recording volumes, and closing the self-noise in the intelligent TV. At the same time, the instructions comparing unit 222 may also output the first environment control signals, in a way of IR or wireless method, to control closing or lowering the volumes of the ambient voice devices.

If the functions detection unit 221 detects it is a gesture recognition function currently running, then the instructions comparing unit 222 may output the second environment control signals to control the system to clean the memory, making the gesture recognition function running smoothly, then remind the user to move to a spatial position suitable for gesture detections, and increasing the TV screen brightness. At the same time, the instructions comparing unit 222 may also output the first environment control signals, through IR or wireless modules, to control and adjust the ambient lights, in order to achieve the best results for gesture recognitions.

It should be understood that, in specific implementations, other functions in the intelligent TV may also be adjusted, to ensure that each function is running smoothly and the users' experiences are the best.

Based on the above said context awareness control system, an embodiment of the present invention also provides a context awareness control method accordingly. Referencing to FIG. 4, the said context awareness control method includes the following steps.

Figure 4:
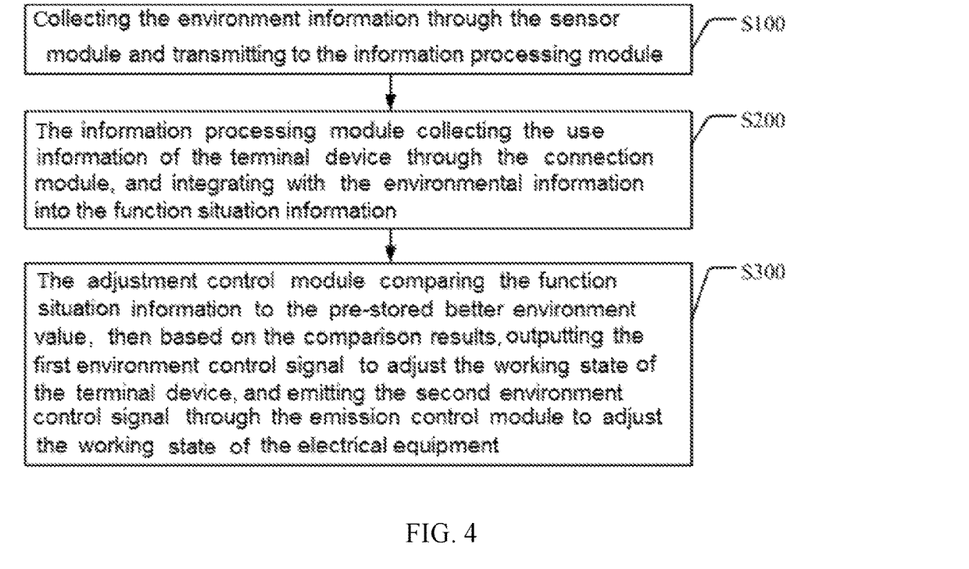
FIG. 4 illustrates a flow chart on the context awareness control method as provided in the present invention.

S100: collecting an environmental information through the sensor module and transmitting to the information processing module.

S200: the information processing module collecting a use information of the terminal device through the connection module, and integrating with the environmental information into a function situation information.

S300: the adjustment control module comparing the said function situation information to the pre-stored better environment value, according to the currently executing function detected, then based on the comparison results, outputting the first environment control signals to adjust the working state of the terminal device, and transmitting the second environment control signals through the emission control module to adjust the working state of the electrical equipment.

Figure 5:
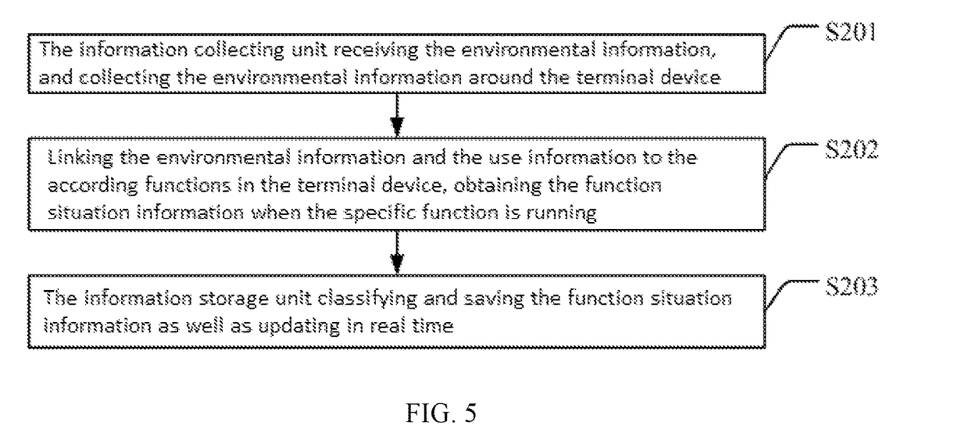
FIG. 5 illustrates a flow chart on the step S200 in the context awareness control method as provided in the present invention.

Referencing to FIG. 5, the said step S200 further includes the following steps.

S201: the information collecting unit receiving the environmental information, and collecting the environmental information around the terminal device.

S202: linking the environmental information and the use information to the according functions in the terminal device, obtaining the function situation information when the specific function is running.

S203: the information storage unit classifying and saving the function situation information as well as updating in real time.

After the operations of "classifying and saving", as described in the step 203, an according relationship chart between the functions in the terminal device and the situation information will be obtained. As shown in FIG. 3, on the right side of the said corresponding relationship chart between the functions and the situation information, it is a functions list, includes a plurality of function items, and on the left side, it is a collection of function situation information, which includes a plurality of information items, each information item contains the currently collected actual information value and the preset better environment value.

Figure 6:
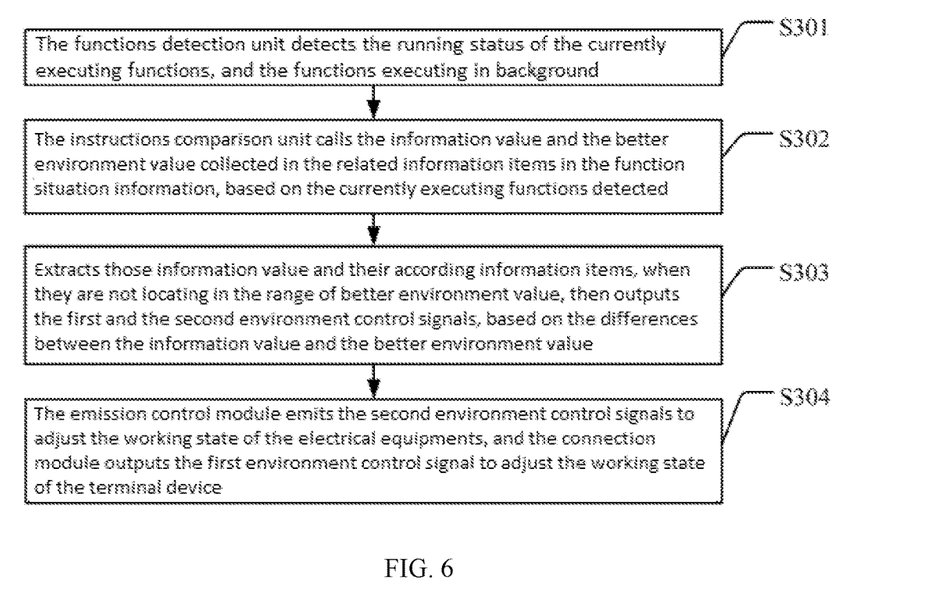
FIG. 6 illustrates a flow chart on the step S300 in the context awareness control method as provided in the present invention.

Checking the chart will make it clear which environmental information and use information needs to be adjusted when running various functions, and the corresponding data range of both environmental information and use information according to the best running status of the function. Therefore, when it is needed to know the functions currently running in the terminal system, referring to FIG. 6, in details, the said step S300 includes the following steps.

step 301: the functions detection unit detects the running state of functions currently running, and functions running in the background.

step 302: the instructions comparison unit calls the information value and the better environment value collected in the related information items in the function situation information, based on the currently executing functions detected, and compares the said information value to the better environment value.

step 303: extracts those information value and their according information items, when they are not locating in the range of better environment value, then outputs the first and the second environment control signals, based on the differences between the information value and the better environment value.

step 304: the emission control module emits the second environment control signals to adjust the working state of the electrical equipment, and the connection module outputs the first environment control signals to adjust the working state of the terminal device.

The said first environment control signals belong to the terminal device, and they are transmitted to the terminal device through the connection module, to adjust the working state of the terminal device. The said second environment control signals belong to the electrical equipment, and they are transmitted to the transmission module for outputting, to adjust the working state of the electrical equipment.

Take the movie watching functions realized in the intelligent TVs as an example, insert the context awareness control device into a USB interface in the intelligent TV. If the intelligent TV has no cameras, a camera may be connected to the context awareness control device, which may start the context awareness control device. The procedure of a better embodiment of the said context awareness control method is as follows.

Step S1: starting a sensor module collecting the environmental information and transmitting it to an information collection unit, also starting the information collection unit collecting the use information.

Both the sensor module and the information collection unit start a thread loop to real time collect the related information separately. After the information collection unit is started, the related information collection programs are run to collect various information including the current network speed, the usage of both system and memory, the functions currently running, and the functions running in the background, and the related use information are obtained. After starting the sensor module, various environmental information including temperature, humidity, location, room space, lighting intensity, noise and else is collected, and related ambient data are obtained.

Step S2: the information collection unit links both the environmental information and the use information to the corresponding functions in the terminal device, and obtains the function situation information of a specific function before transmitting to the information storage unit.

Save the use information and the environmental information, and start two other threads in charge of real time updating the environmental information and the use information accordingly.

Meanwhile, the functions detection unit detects and records a currently executing functions F1 in the intelligent TV, and functions F2 . . . Fn, running in the background, as well as any network data transmissions.

Step S3: the information storage unit sets up indexes to the function situation information, and links to the corresponding functions in the terminal device, then stores the real information value in the function situation information to the information items in the buffer. This may improve the visiting speed.

Step S4: extracting the information value of various information items according to the currently executing function F1, and comparing it to the pre-stored better environment value.

If each information value of the currently executing function F1 is locating in the data range of the better environment value, then it is sure that the current function F1 will be executed smoothly.

If some of the various information value of the currently executing function F1 are not locating in the data range of the better environment value, then adjustments to those information items not locating in the range will be required.

Step S5: extracting those information value of the function F1 and their according information items which are not locating in the range of the better environment value, then outputting the first and the second environment control signals based on the differences between the information value and the better environment value.

If an information value is smaller or larger than the better environment value, then the environment control signals are output to adjust the working state of electrical equipment or terminal device according to the information items, until the information value increase or decrease to locate in the range of better environment value.

In the said step S5, it may generate corresponding environment control signals one by one, following the sequence of information items in the FIG. 3, or, it may generate these signals at the same time. If they are the second environment control signals, then they will be output to the emission control module, and transmitted to the corresponding electrical equipment in a way of IR transmission or wireless controlling or 2.4 G radio transmission, to realize the adjustments. If they are the first environment control signals, then they will be transmitted to the terminal device through the connection module for adjustments directly.

Step S6, finishing the executing functions running.

In summary, the context awareness control device, system and method as provided in the present invention. The context awareness control device collects the use information of the terminal device and the environmental information around the terminal device, and compares the currently obtained environmental information and use information to the saved better environment value. Based on the comparison results, the context awareness control device adjusts the related functions in the terminal device (such as the systems, voices running in the background) and the surrounding environments (such as temperature, brightness and more) appropriately. The context awareness control device promotes the functions demonstrating and running smoothly, and provides a better use environment for users. The context awareness control device also helps to guide and promote the development of intelligent TVs, and helps to promote innovations of the product usage methods. Therefore, the context awareness control device, system and method have a broad application prospect and a practical value.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A context awareness control device configured to connect to a terminal device and an electrical device functionally related to user's senses, comprising:
   a connection module;
   a sensor module;
   an emission control module;
   an information processing module; and
   an adjustment control module;
   wherein the sensor module collects an environmental information and transmits to the information processing module;
   the information processing module collects an operational data of the terminal device related to an operational status of the terminal device through the connection module, and integrates the operational data with the environmental information together to generate a function situation information;
   the adjustment control module compares the function situation information to a pre-stored environmental value, wherein the pre-stored environmental value includes ranges of the environmental information and the operational data of the terminal device for running a specific operational function of the terminal device;
   when the function situation information is not in a data range of the pre-stored environmental value, a first environment control signal is outputted to adjust a working state of the terminal device, and a second environment control signal is transmitted through the emission control module to adjust a working state of the electrical device;
   wherein the information processing module comprises:
      an information collection unit and an information storage unit;
      the information collection unit receives the environmental information, collects the operational data from the terminal device, links the environmental information and the operational data to the specific operational function of the terminal device, and obtains the function situation information when the specific operational function of the terminal device is enabled; and
      the information storage unit classifies and saves the function situation information, and updates the function situation information in real time;
   wherein the adjustment control module comprises:
      a function detection unit and an instruction comparison unit;
      the function detection unit detects a state of currently executing function of the terminal device and background executing function of the terminal device; and
      the instruction comparison unit compares an information value of the function situation information with the pre-stored environmental value;
      when the information value is not in the data range of the pre-stored environmental value, the instruction comparison unit outputs the first environment control signal and the second environment control signal based on a difference between the information value and the pre-stored environmental value.

2. The context awareness control device according to claim 1, wherein the sensor module further includes:
   a temperature sensor, a humidity sensor, a position sensor, a spatial sensor, a light intensity sensor, a noise sensor and a radio interference sensor.

3. The context awareness control device according to claim 1, wherein the emission control module further includes:
   an IR transmitter, applied to convert the second environment control signals into infrared signals then transmit out; and
   a 2.4G transmitter, applied to transmit the second environment control signals in radio.

4. The context awareness control device according to claim 1, wherein the terminal device operational data collected by the information collection unit includes:
   the current network speed of the terminal device, the system and memory usage, the functions currently running, the functions running in the background, the radio interferences, and the number of people around, the users' ages, use frequencies, watching habits, as well as the time, the device volumes, the network security and the screen brightness.

5. A context awareness control system, comprising a terminal device, an electrical equipment functionally related to user's senses and a context awareness control device, wherein
   the context awareness control device is inserted and connects to the terminal device, and connects to the electrical equipment in wireless;
   the context awareness control device comprises a connection module, a sensor module, an emission control module, an information processing module and an adjustment control module;
   the context awareness control device obtains an environmental information and a terminal device operational data, integrates the environmental information and the terminal device operational data into a function situation information, compares the function situation information with a pre-stored environmental value, wherein the pre-stored environmental value includes ranges of the environmental information and the operational data of the terminal device for running a specific operational function of the terminal device,
   when the function situation information is not in a data range of the pre-stored environmental value, the context awareness control device generates a first environment control signal and a second environment control signal to adjust an operational function of the terminal device and the electrical equipment accordingly;
wherein the adjustment control module comprises:
a function detection unit and an instruction comparison unit;
the functions detection unit detects a state of currently running function of the terminal device and background running function of the terminal device; and
the instruction comparison unit compares an information value of the function situation information with the pre-stored environmental value;
when the information value is not in the data range of the pre-stored environmental value, the instruction comparison unit outputs the first environment control signal and the second environment control signal based on a difference between the information value and the pre-stored environmental value.

6. The context awareness control system according to claim 5, wherein the sensor module includes:
a temperature sensor, a humidity sensor, a position sensor, a spatial sensor, a light intensity sensor, a noise sensor and a radio interference sensor.

7. The context awareness control system according to claim 5, wherein the emission control module includes:
an IR transmitter, applied to convert the second environment control signals into infrared signals before transmitting;
a 2.4G transmitter, applied to transmit the second environment control signals in radio.

8. The context awareness control system according to claim 5, wherein the information processing module includes:
an information collection unit and an information storage unit,
wherein the information collection unit receives the environmental information, collects the operational data from the terminal device, then links the environmental information and the operational data to a specific operational function of the terminal device, and obtains the function situation information when the specific operational function of the terminal device is enabled, and
the information storage unit classifies and saves the function situation information, and updates the function situation information in real time.

9. The context awareness control system according to claim 5, wherein the terminal device usage information collected by the information collection unit includes:
the current network speed of the terminal device, the system and memory usage, the functions currently running, the functions running in the background, the radio interferences, and the number of people around, the users' ages, use frequencies, watching habits, as well as the time, the device volumes, the network security and the screen brightness.

10. A context awareness control method, comprising:
collecting, by a sensor module, an environmental information and transmitting the environmental information to an information processing module;
collecting, by the information processing module, an operational data of a terminal device through a connection module, and integrating the operational data with the environmental information to generate a function situation information; and
comparing the function situation information to a pre-stored environmental value, wherein the pre-stored environmental value includes ranges of the environmental information and the operational data of the terminal device for running a specific operational function of the terminal device;
when the function situation information is not in a data range of the pre-stored environmental value, outputting a first environment control signal to adjust a working state of the terminal device, and transmitting a second environment control signal to adjust a working state of the electrical equipment, through an emission control module;
wherein the adjustment control module comprises:
a function detection unit and an instruction comparison unit;
the functions detection unit detects a state of currently running function of the terminal device and background running function of the terminal device; and
the instruction comparison unit compares an information value of the function situation information with the pre-stored environmental value;
when the information value is not in the data range of the pre-stored environmental value, the instruction comparison unit outputs the first environment control signal and the second environment control signal based on a difference between the information value and the pre-stored environmental value.

11. The context awareness control method according to claim 10, wherein, collecting, by the information processing module, the operational data of the terminal device through the connection module, and integrating the operational data with the environmental information to generate the function situation information, comprises:
obtaining the environmental information through an information collecting unit, collecting the environmental information around the terminal device;
linking the environmental information and use information to the corresponding functions in the terminal device, and obtaining the function situation information when the specific operational function is running; and
classifying and saving the function situation information, and updating the function situation information in real time.

12. The context awareness control method according to claim 10, wherein, comparing the function situation information to the pre-stored environmental value; when the function situation information is not in the data range of the pre-stored environmental value, outputting the first environment control signal to adjust the working state of the terminal device, and transmitting the second environment control signal to adjust the working state of the electrical equipment, through the emission control module, comprises:
detecting the running status of the currently executing functions of the terminal device, and the functions executing in background of the terminal device;
comparing the information value collected from the related information items in the function situation information with the pre-stored environmental value;
extracting those information value and the information items not locating in the ranges of the pre-stored environmental value, outputting the first environment control signal and the second environment control signal, according to the differences between the information value and the pre-stored environmental value;
emitting the second environment control signal to adjust the working state of the electrical equipment, and transmitting the first environment control signal to the terminal device to adjust the working state of the terminal device.

* * * * *